United States Patent
Larsson

(10) Patent No.: US 7,156,275 B2
(45) Date of Patent: Jan. 2, 2007

(54) WELDING HEAD, WELDING SYSTEM, METHOD AND COMPUTER PROGRAM FOR FRICTION STIR WELDING

(75) Inventor: Rolf Larsson, LaxÅ (SE)

(73) Assignee: ESAB AB, Göteborg (SE)

( * ) Notice: Subject to any disclaimer, the term of this patent is extended or adjusted under 35 U.S.C. 154(b) by 43 days.

(21) Appl. No.: 10/503,034

(22) PCT Filed: Feb. 3, 2003

(86) PCT No.: PCT/SE03/00186

§ 371 (c)(1),
(2), (4) Date: Feb. 28, 2005

(87) PCT Pub. No.: WO03/064100

PCT Pub. Date: Aug. 7, 2003

(65) Prior Publication Data

US 2005/0139639 A1   Jun. 30, 2005

(30) Foreign Application Priority Data

Feb. 1, 2002   (SE) .................................... 0200303

(51) Int. Cl.
*B23K 20/12* (2006.01)
*B23K 37/00* (2006.01)
(52) U.S. Cl. .................................... 228/2.1; 228/112.1
(58) Field of Classification Search ............. 228/112.1, 228/2.1
See application file for complete search history.

(56) References Cited

U.S. PATENT DOCUMENTS

| | | | | |
|---|---|---|---|---|
| 4,144,110 A | * | 3/1979 | Luc ............................ | 156/73.5 |
| 5,460,317 A | * | 10/1995 | Thomas et al. ........... | 228/112.1 |
| 6,170,731 B1 | * | 1/2001 | Hofius et al. ................ | 228/2.1 |
| 6,199,745 B1 | * | 3/2001 | Campbell et al. ......... | 228/112.1 |
| 6,367,681 B1 | * | 4/2002 | Waldron et al. .......... | 228/112.1 |
| 6,789,722 B1 | * | 9/2004 | Murakami ................ | 228/112.1 |
| 6,799,708 B1 | * | 10/2004 | von Strombeck et al. ... | 228/2.1 |
| 6,886,732 B1 | * | 5/2005 | Yoshinaga ................... | 228/2.3 |

(Continued)

FOREIGN PATENT DOCUMENTS

JP    2002045981 A   *   2/2002

(Continued)

OTHER PUBLICATIONS

File EPODOC/European Patent Office, Hitachi Ltd.: "Method And Device For Friction-Stir-Welding", Jp-A-2001287053, Oct. 16, 2001.

*Primary Examiner*—Lynne R. Edmondson
(74) *Attorney, Agent, or Firm*—Dilworth & Barrese LLP

(57) ABSTRACT

Welding head 1 for friction stir welding, adapted for connection and driving of a tool 2 intended for simultaneous friction stir welding from two opposite surfaces on an object for welding, comprising a tool holder 9, a force-generating device 3, 13 and a rotary driving device 5 which, during operation, can impart to the connected tool 2 a cyclic movement around the centre axis 10 of the tool and relative to the object for welding arranged in conjunction with the welding head. The force-generating device is controllable during operation and adapted so as, during operation, to act between a primary shoulder 6 and a secondary shoulder 7 on a tool 2 connected in the tool holder 9. The invention also comprises a welding system for friction stir welding, with the force between the shoulders of the tool being controlled depending on the current torque for rotary driving. Also indicated are a method for initiating friction stir welding and computer program for such a method.

19 Claims, 2 Drawing Sheets

U.S. PATENT DOCUMENTS

2001/0038028 A1* 11/2001 Iwashita .................. 228/112.1
2005/0103824 A1* 5/2005 Waldron et al. ......... 228/112.1
2005/0139640 A1* 6/2005 Kay ........................ 228/112.1

FOREIGN PATENT DOCUMENTS

WO    00/02699    1/2000

* cited by examiner

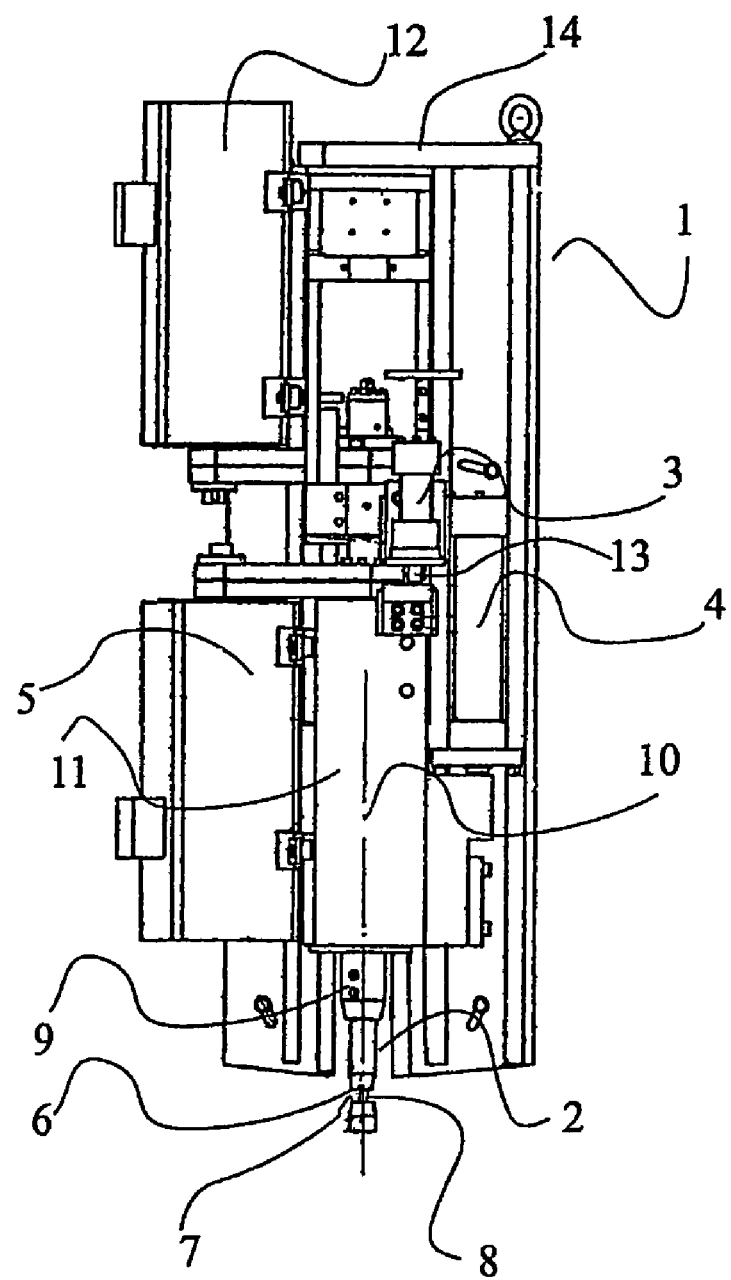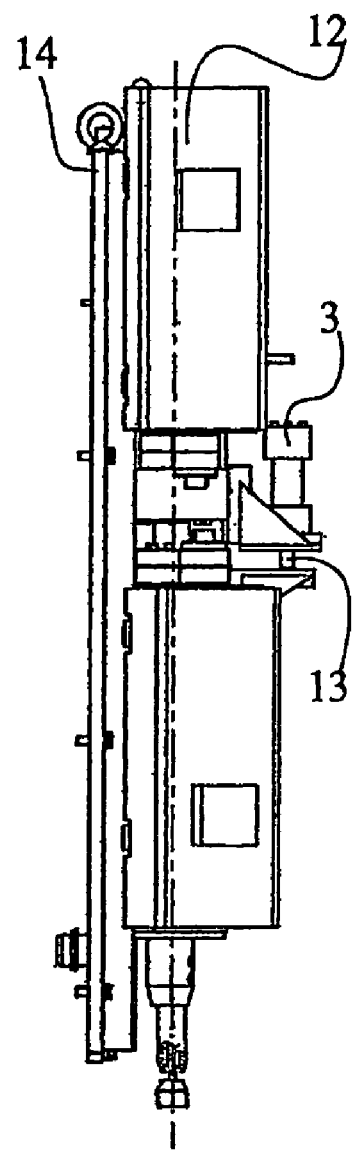
Fig. 2
Fig. 3

WELDING HEAD, WELDING SYSTEM, METHOD AND COMPUTER PROGRAM FOR FRICTION STIR WELDING

TECHNICAL FIELD

The present invention relates to a welding head adapted for connection of a welding tool designed for friction stir welding from two opposite sides of an object for welding and also a welding system, a starting method and computer program for this method for corresponding welding, all according to the introductory parts of the independent patent claims.

BACKGROUND

The friction stir welding method is comprehensively described in WO 93/10935, where it emerges that a tool can consist of at least one shoulder and a probe. The probe rotates in the joint during welding, and the shoulder, which has a greater diameter than the probe, is at the same time pressed against the surface of the object for welding while cyclic movement takes place, usually rotation about the axis of symmetry. The object for welding, which in most cases consists of two workpieces which are to be welded together, is plasticized in and next to the joining line by the heat which is supplied to the object by the rotation of the probe in the joint and the rotation of the shoulder on the surface of the object for welding. As the tool is removed, the joint solidifies along the joining line, and the workpieces are joined in a strong welded joint without the material having had to be heated to melting temperature. One requirement is that the tool is made from a harder material than the object for welding. The quantity of heat supplied and the heat distribution in the object for welding are dependent on, for example, material type in the workpiece and tool and also on the geometrical design of the tool, the force applied to the shoulder and the rotation speed of the tool.

WO 93/10935 also describes a tool with double shoulders, where the two opposite sides of the object for welding are each in contact with their respective shoulder during welding, while the probe of the tool extends through the object for welding and interconnects the two shoulders. The primary shoulder can then be connected movably to the probe, while the secondary shoulder is connected firmly to the probe. It also emerges from this specification that the parts can be spring-loaded in such a way that the opposite surfaces of the object for welding are thus, via the shoulders, each subjected to a force directed at right angles in towards the surface and parallel to the rotation axis of the tool. This force is necessary in order that each shoulder will develop friction, and thus heat, when movement relative to the object for welding takes place. One disadvantage of this simple method of applying force between the shoulders and the object for welding is that the force cannot easily be controlled according to varying heat requirements—thick workpieces require more heat than thin workpieces in order to achieve a perfect welding result, and therefore greater applied force.

WO 00/02699 offers a solution to this problem by virtue of the shoulders having been provided with separate controllable force-generating devices. A control system then adjusts these forces so that they balance one another. In practice, however, it has proved to be difficult to achieve perfect welding results using this method, especially in the case of thin material for welding and when the force-generating devices have consisted of hydraulic cylinders.

THE OBJECT OF THE INVENTION

The object of the invention is to eliminate or reduce the disadvantages which, as above, are inherent in the prior art with regard to friction stir welding with a tool with shoulders for bearing against opposite sides of an object for welding. The invention solves these problems in ways which are described in the characterizing parts of the independent patent claims.

In testing various solutions for the problem of inconsistent welding quality, especially in thinner material, it has been found that a solution with only one force-generating device for applying the relative force between two shoulders, and thus the force acting against the opposite surfaces of the object for welding during welding, was considerably more favourable compared with previous solutions. This single device will then be connected to the parts in the welding head which provide axial movement to the primary and, respectively, secondary shoulder of a connected tool.

One reason for this better welding result may be that it is much easier to set low forces with accuracy and repeatability with, for example, a single hydraulic cylinder than with two, the forces of which have to be balanced. Two cylinders represent, for example, greater internal friction than one, which can contribute to the difficulties associated with previously known art. The stroke of this single cylinder is moreover considerably shorter than that of the one being replaced, which saves both space and costs. As far as stroke is concerned, the cylinder according to the invention is to span only the thickness variations which arise in the objects for welding concerned, while a corresponding cylinder according to the prior art must have a stroke which also extends over the distance from the rest position of the welding head to its operating position, that is to say in contact with the workpiece.

Advantageous embodiments of the invention are described in the dependent claims.

BRIEF DESCRIPTION OF THE DRAWINGS

FIG. 2 shows an embodiment of the invention with tool mounted (view from the front).

FIG. 3 shows an embodiment of the invention with tool mounted (view from the left side).

DESCRIPTION OF DRAWINGS AND PREFERRED EMBODIMENTS

Figure 1:
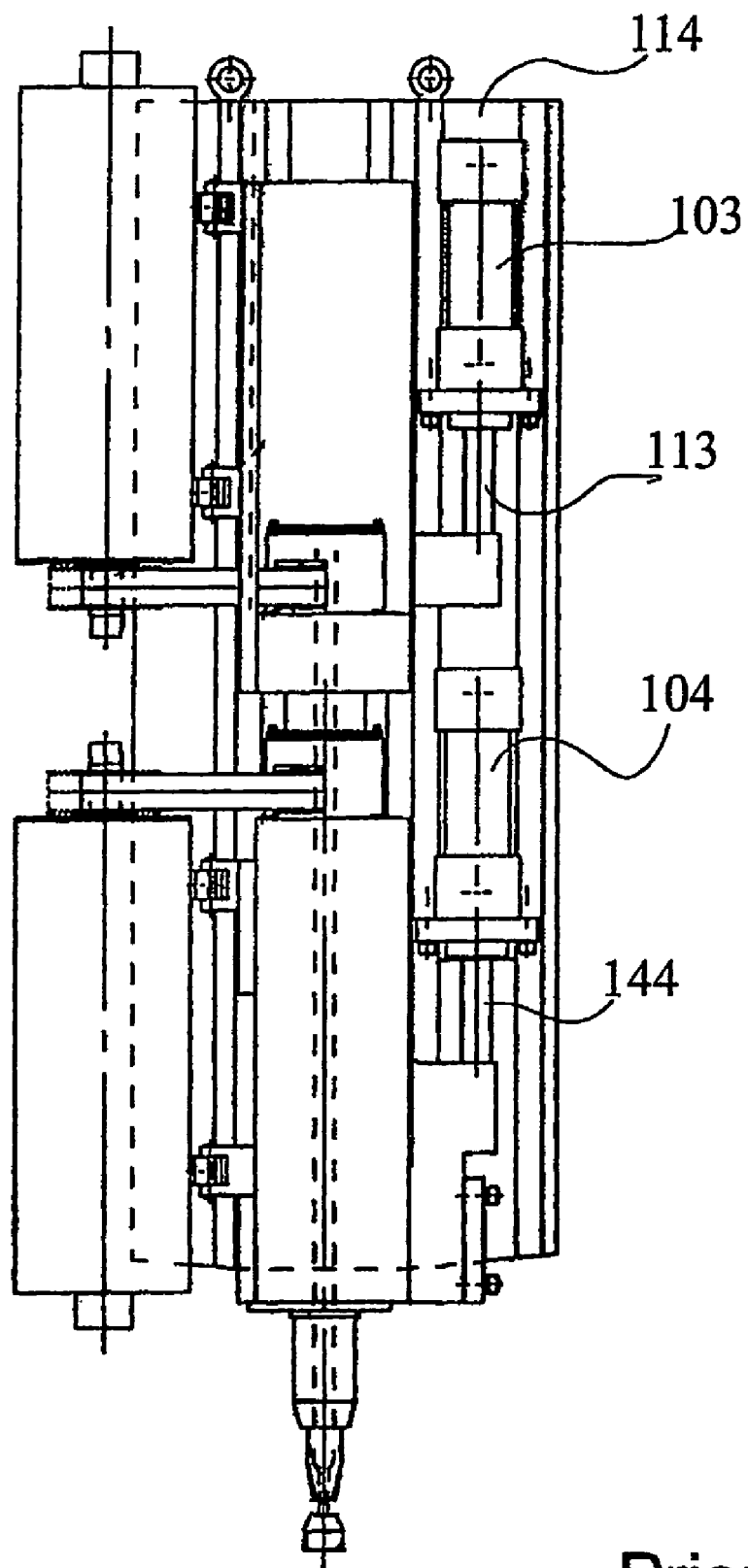
FIG. 1 shows a welding head according to the prior art with tool mounted.

The drawings and examples of embodiments of the invention will now be described in greater detail with reference to the figures.

FIG. 1 shows a welding head for friction stir welding according to the prior art. The welding head comprises inter alia a base-plate 114 and a hydraulic cylinder 104, with associated piston rod 144, for moving the tool from rest position into operating position in contact with the object for welding. This cylinder also applies the force from the primary shoulder, which belongs to the tool which can be mounted in the welding head, to one surface of the object for welding. The welding head also comprises a second hydraulic cylinder 103, with associated piston rod 113, for moving the secondary shoulder of the tool, which is connected to the probe of the tool. The force from the secondary shoulder is applied to the opposite surface of the object for welding by means of this second cylinder 103. Both cylinders are connected firmly to the base-plate 114. The pressures from the two cylinders will normally not differ more than the object for welding can take up without being deformed.

FIGS. 2 and 3 show an embodiment of the invention in the form of a welding head 1 for friction stir welding constructed on a base-plate 14. The welding head is shown with a tool 2 for friction stir welding mounted in a tool holder 9 belonging to the welding head. This tool comprises a primary shoulder 6 intended to be pressed, during welding, against a first surface of the object for welding at the same time as it performs a cyclic movement around the centre axis 10 of the tool. The tool also comprises a probe 8 intended to work, during welding, in the joint on the object for welding in a cyclic movement around its centre axis 10. The probe 8 is, at one of its ends, via a hole in the primary shoulder 6 of the tool and also via a spindle passing through the tool holder 9 and a spindle housing 11, connected to a device 3, 13 for axial positioning and to a device 12 for rotary driving of the probe and a secondary shoulder 7 connected to the other end of the probe.

The spindle housing 11, with the tool holder 9 mounted in it and also a rotary driving device 5 for the primary shoulder, is mounted movably in relation to the base-plate 14 via a slide. The relative movement between the base-plate and this slide is brought about by a device 4 for axial positioning of the primary shoulder 6. In this example, this device consists of a hydraulic cylinder fixed to the base-plate 14, with the piston rod fixed to the slide. Also connected to this slide is the piston rod 13 in the device for axial positioning of the probe and the secondary shoulder, while a corresponding cylinder housing 3 is connected firmly to a slide which supports the rotary driving device 12 and also an axial bearing unit for the spindle for positioning and rotary driving of the secondary shoulder in the connectable tool. This arrangement with one cylinder 4 for positioning the whole tool against the object for welding and another cylinder 3 for application of the force between the shoulders of the tool and the respective surface on the object for welding allows very fine adjustment of the force between the tool and the object for welding. This leads to it being easier to control the heat supply during welding, which is absolutely crucial for the resulting welding quality. The devices 5 and, respectively, 12 for rotary driving of the shoulders can consist of, for example, electric motors or hydraulic motors. The main function of the device 3, 13 for axial positioning of the probe and the secondary shoulder is to generate the force between the shoulders and the surfaces of the workpiece, for which reason it is referred to below as the force-generating device.

The method used on starting welding is also of significance for the heat build-up in the object for welding. A suitable method is first to make the shoulders move towards the respective surfaces of the object for welding without the cyclic movement of the tool around the centre axis 10 having started. In the next step, the said cyclic movement is started, and then the force is applied between the tool and the object for welding by virtue of the force-generating device 3, 13 drawing the shoulders towards one another. After a sufficient time delay to reach the correct temperature in the joint, movement of the welding head along the length of the joint begins. This method avoids either shoulder eating into the object for welding before the correct force between the shoulders has been applied, which happens easily if the tool is rotating when it makes contact with the object for welding.

It is also possible to have common rotary driving of the primary and secondary shoulders and also of the probe. One of the rotary driving devices 5, 12 can then be dispensed with and is suitably replaced by a driver arrangement. It is a great advantage, however, to have separate rotary driving devices as illustrated in the figures, because the heat requirement can be different from the opposite sides of the object for welding. This may be the case when, for example, the object for welding consists of two workpieces of different thickness which are to be lap-welded. Another example may be that two different materials with different thermal conductivity are to be welded together in a lap joint. It is then highly advantageous to have separate rotary driving devices so that each shoulder can be programmed with its own speed. Different force can likewise be applied to the two shoulders. This force asymmetry is then brought about by means of the device 4 for axial positioning of the primary shoulder. The heat supply via the shoulder depends on the diameter, material, rotation speed and application force of the shoulder. The easiest of these parameters to control is the rotation speed.

In order to ensure that the heat supply is kept constant along the entire joint even if thickness variations are present in the material being welded, the application force between the shoulders can be controlled depending on the motor current to the rotary driving devices, which constitutes a measure of the current torque for rotary driving. When the motor current increases above a nominal value, the application force is reduced.

Great variation in the configuration of a welding head is of course possible within the scope of the patent claims. Cylinder-housing fastening parts and piston-rod fastening parts can thus of course be changed without functioning being altered. Likewise, for example, the driving devices for positioning and force-generating devices can be exchanged for a motor and rack or ball screw.

The invention claimed is:

1. Welding head (1) for friction stir welding, said welding head (1) structured and arranged for connection to and driving of a tool (2) structured and arranged for simultaneous friction stir welding from two opposite surfaces on an object for welding, said welding head (1) comprising
 a tool holder (9),
 the tool (2) comprising a primary shoulder (6), and a probe (8) arranged to concentrically protrude from both said tool holder (9) and tool (2) at said primary shoulder (6).
 a single force-generating device (3,13), and
 a rotary driving device (12) structured and arranged to impart to the tool (2) and probe (8) during operation, cyclic movement around a center axis (10) of the tool (2) and relative to the object for welding arranged in conjunction with the welding head (1), wherein
 the tool (2) comprises a secondary shoulder (7) at an end of said probe (8) and arranged to face said primary shoulder (6), and
 said force-generating device (3, 13) is controllable during operationd to act between the primary shoulder (6) and secondary shoulder (7) only on said probe (8) of said tool (2) concentrically arranged in the tool holder (9).

2. Welding head according to claim 1, also comprising a device (4) for axial positioning of the tool holder (9) relative to an object for welding, where the force generating device (3, 13) acts relative to the tool holder (9).

3. Welding head according to claim 1, where the force-generating device consists of a hydraulic cylinder (3) with associated piston rod (13).

4. Welding head according to claim 1, where the force-generating device consists of a motor and a ball screw.

5. Welding system for friction stir welding, comprising a welding head adapted for connection and driving of a tool (2) intended for simultaneous friction stir welding from two opposite surfaces on an object for welding, comprising a tool holder (9), a force-generating device (3, 13) and a rotary driving device (5) which, during operation, can impart to the connected tool (2) a cyclic movement around the centre axis (10) of the tool and relative to the object for welding arranged in conjunction with the welding head, and also comprising on the one hand a movement device for advancing said welding head along a joint line on the object for welding and on the other hand a control unit for said rotary driving device (5), force-generating device (3, 13) and movement device, characterized in that the control unit regulates the force-generating device depending on the current torque to the rotary driving device.

6. Method for initiating simultaneous friction stir welding from two opposite surfaces on an object for welding with a tool (2) comprising a primary shoulder (6) and a secondary shoulder (7) at an end of an intermediate probe (8) opposite the primary shoulder (6) with the intermediate probe (8) arranged to concentrically protrude from the primary shoulder (6), having the following steps in sequence:
- the shoulders (6, 7) are positioned against respective opposite sides of the object for welding without movement around a center axis (10) of the tool (2),
- a cyclic movement around the center axis the tool (2) is started,
- a force is applied only on said probe (8) between the shoulders (6, 7) and the object for welding, and
- after a sufficient time delay for heating the object for welding to a suitable working temperature, movement of the tool (2) along the joint line on the object for welding is started.

7. Computer program for implementing the method according to claim 6.

8. Welding head according to claim 2, where the force-generating device consists of a hydraulic cylinder (3) with associated piston rod (13).

9. Welding head according to claim 2, where the force-generating device consists of a motor and a ball screw.

10. Welding head according to claim 1, additionally comprising
- a separate rotary driving device (5) structured and arranged to impart to the tool holder (9) and primary shoulder (6) of said tool (2) during operation, a cyclic movement around the center axis (10) of the tool (2) and relative to the object for welding.

11. Welding head according to claim 10, wherein said separate rotary driving device (5) is structured and arranged to impart the cyclic movement to said tool holder (9) and primary shoulder (6) of said tool (2) independently from the cyclic movement being imparted to said probe (8) and secondary shoulder (7) by said initial rotary driving device (12).

12. Welding head according to claim 11, wherein said force-generating device (3, 13) comprises
- a cylinder (3) coupled to said initial rotary driving device (12), and
- a piston (13) coupled to said probe (8) and secondary shoulder (7) and arranged to slidably move into or out of said cylinder (3).

13. Welding head according to claim 12, additionally comprising means (4) for axially-positioning said tool holder (9) and primary shoulder (6) of said tool (2).

14. Welding head according to claim 13, additionally comprising a base plate (14), wherein
- said axially-positioning means (4) comprise a cylinder mounted on the base plate (14) and a piston rod slidably mounted in the cylinder and coupled to said tool holder (9).

15. Welding head according to claim 1, additionally comprising means (4) for axially-positioning said tool holder (9) and primary shoulder (6) of said tool (2).

16. Welding head according to claim 15, additionally comprising a base plate (14), wherein
- said axially-positioning means (4) comprise a cylinder mounted on the base plate (14) and a piston rod slidably mounted in the cylinder and coupled to said tool holder (9).

17. Welding head according to claim 16, wherein said force-generating device (3, 13) comprises
- a cylinder (3) coupled to said tool holder (9) and a piston (13) coupled to said probe (8) and secondary shoulder (7) and arranged to slidably move into or out of said cylinder (3).

18. Welding head according to claim 15, wherein said force-generating device (3, 13) comprises a cylinder (3) coupled to said axially-positioning means (4) and a piston (13) coupled to said probe (8) and secondary should (7) and arranged to slidably move into or out of said cylinder (3).

19. The method of claim 6, wherein the force is applied by moving the probe (8) and secondary shoulder (7) relative to the primary shoulder (6).

* * * * *